United States Patent
Kim

(10) Patent No.: US 7,337,449 B2
(45) Date of Patent: Feb. 26, 2008

(54) DISK DRIVE FOR MINIMIZING JAMMING DURING DISK POSITIONING

(75) Inventor: Dong-man Kim, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 224 days.

(21) Appl. No.: 10/941,872

(22) Filed: Sep. 16, 2004

(65) Prior Publication Data
US 2005/0060726 A1    Mar. 17, 2005

(30) Foreign Application Priority Data
Sep. 17, 2003    (KR) ...................... 10-2003-0064585

(51) Int. Cl.
*G11B 17/04*    (2006.01)
*G11B 17/03*    (2006.01)

(52) U.S. Cl. ...................................... 720/616; 720/603

(58) Field of Classification Search ................. 720/603, 720/604
See application file for complete search history.

(56) References Cited

U.S. PATENT DOCUMENTS

| | | | | |
|---|---|---|---|---|
| 4,627,598 A | * | 12/1986 | Fremy | 251/149.2 |
| 4,928,271 A | * | 5/1990 | Verhagen | 369/292 |
| 4,980,883 A | * | 12/1990 | Mutou et al. | 720/720 |
| 5,067,121 A | * | 11/1991 | Einhaus | 720/612 |
| 5,105,414 A | * | 4/1992 | Funabashi et al. | 720/613 |
| 5,737,304 A | * | 4/1998 | Soga et al. | 720/692 |
| 5,737,305 A | * | 4/1998 | Kayukawa | 720/604 |
| 5,793,728 A | | 8/1998 | Selby et al. | |
| 6,285,643 B1 | | 9/2001 | Arai | |
| 6,345,035 B1 | * | 2/2002 | Aoki et al. | 720/720 |
| 6,529,461 B1 | * | 3/2003 | Watanabe et al. | 720/732 |
| 6,700,850 B2 | * | 3/2004 | Takahashi et al. | 720/601 |
| 2003/0179660 A1 | * | 9/2003 | Fujita | 369/30.36 |
| 2005/0039198 A1 | * | 2/2005 | You | 720/603 |

FOREIGN PATENT DOCUMENTS

| | | |
|---|---|---|
| CN | 1367489 A | 8/2001 |
| EP | 0 698 882 A2 | 2/1996 |
| EP | 0 764 947 A2 | 3/1997 |
| JP | 2000-348478 | 12/2000 |
| JP | 2003-248997 | 9/2003 |
| KR | 2002-0013200 | 2/2002 |
| KR | 2003-0009304 | 1/2003 |

* cited by examiner

*Primary Examiner*—Angel Castro
*Assistant Examiner*—Christopher R. Magee
(74) *Attorney, Agent, or Firm*—Roylance, Abrams, Berdo & Goodman, LLP

(57) ABSTRACT

A disk drive including a tray having a seating portion in which a disk or disk cartridge is seated, and an opening hole, and further having a disk cartridge holder installed on the tray to be capable of sliding, the disk cartridge holder fixing the disk cartridge to the seating portion. The disk cartridge holder includes a plurality of ribs which protrude toward the opening hole and which prevent the disk, to be seated in the seating portion, from becoming caught between the disk cartridge holder and the tray.

20 Claims, 5 Drawing Sheets

DISK DRIVE FOR MINIMIZING JAMMING DURING DISK POSITIONING

CROSS-REFERENCE TO RELATED APPLICATIONS

This application claims the benefit under 35 U.S.C. §119 (a) of Korean Patent Application No. 2003-64585, filed in the Korean Intellectual Property Office on Sep. 17, 2003, the entire contents of which are incorporated herein by reference.

BACKGROUND OF THE INVENTION

1. Field of the Invention

The present invention relates to a disk drive. More particularly, the present invention relates to a disk drive in which a disk or a disk cartridge holding a disk, can be selectively placed without difficulty.

2. Description of the Related Art

A disk drive, which reads or writes information, can be classified into a slot-in type, in which a disk is inserted, and a disk cartridge type, in which a disk cartridge holding a disk is inserted, according to the format of a recording medium.

Although the disk drive performs the same reading or writing operations with respect to a disk or a disk cartridge, a tray in which the disk or the disk cartridge is placed is formed differently due to different structures of the disk and the disk cartridge. However, this results in increased manufacturing costs. Therefore, a disk drive, which is capable of selectively accommodating a disk or a disk cartridge is required.

FIG. 1 is a perspective view of an example of a tray in which a disk or disk cartridge is selectively accommodated. FIG. 2 is a drawing illustrating a disk which is caught between a tray 10 and a disk cartridge holder 14.

Referring to FIG. 1, a first seating portion 11 in which a 120 mm disk (not shown) is accommodated, and a second seating portion 12 in which a 80 mm disk (not shown) is seated, are installed in an upper surface of a tray 10. A third seating portion 13 in which a disk cartridge (not shown) holding a disk is seated, is also installed in the tray 10.

Additionally, a disk cartridge holder 14 capable of sliding in the arrow direction and fixing the disk cartridge (not shown) to the third seating portion 13, is installed in the upper surface of the tray 10. The disk cartridge holder 14, which is supported by a spring 16, receives an elastic force in a direction opposite to an insertion direction of the disk cartridge.

An opening hole 17 is also formed in the tray 10. The opening hole 17 has a width W to allow access by a spindle motor (not shown) which rotates a disk, and to allow an optical pickup device (not shown) which reads or writes information, to slide in a direction radial to the disk.

Referring to FIG. 2, it is preferable that a 120 mm disk D is placed horizontally onto the first seating portion 11 when placed by a user, but the disk D may be placed slantly onto the first seating portion 11.

In this case, the disk D may become caught between the disk cartridge holder 14 and the opening hole 17 because the width W of the opening hole 17 is large.

If this occurs, an information recording plane of the disk D may be scratched. In addition, as the disk D slides to a main frame 20 while being caught between the disk cartridge holder 14 and the opening hole 17, the disk may operate improperly.

Accordingly, where the disk D is slantly placed into the first seating portion 11, a need exists for a structure to prevent the disk D from becoming caught between the disk cartridge holder 14 and the opening hole 17, and which is capable of stably placing the disk D onto the first seating portion 11.

SUMMARY OF THE INVENTION

The present invention provides a disk drive having an improved structure which allows a disk to be placed onto a seating portion, even when the disk is slantly inserted into a tray.

According to an object of the present invention, a disk drive is provided comprising a tray including a seating portion in which a disk or disk cartridge is seated, and an opening hole. The disk drive further comprises a disk cartridge holder installed on the tray to be capable of sliding, the disk cartridge holder fixing the disk cartridge to the seating portion. The disk cartridge holder has a plurality of ribs which protrude toward the opening hole and which prevent the disk, which is to be seated in the seating portion, from becoming caught between the disk cartridge holder and the tray.

BRIEF DESCRIPTION OF THE DRAWINGS

The above and other objects, features and advantages of the present invention will become more apparent by describing in detail an exemplary embodiment thereof with reference to the attached drawings in which.

Throughout the drawings, like reference numerals will be understood to refer to like parts, components and structures.

DETAILED DESCRIPTION OF THE EXEMPLARY EMBODIMENTS

The present invention will now be described in greater detail with reference to the attached drawings, in which exemplary embodiments thereof are shown.

Figure 1:
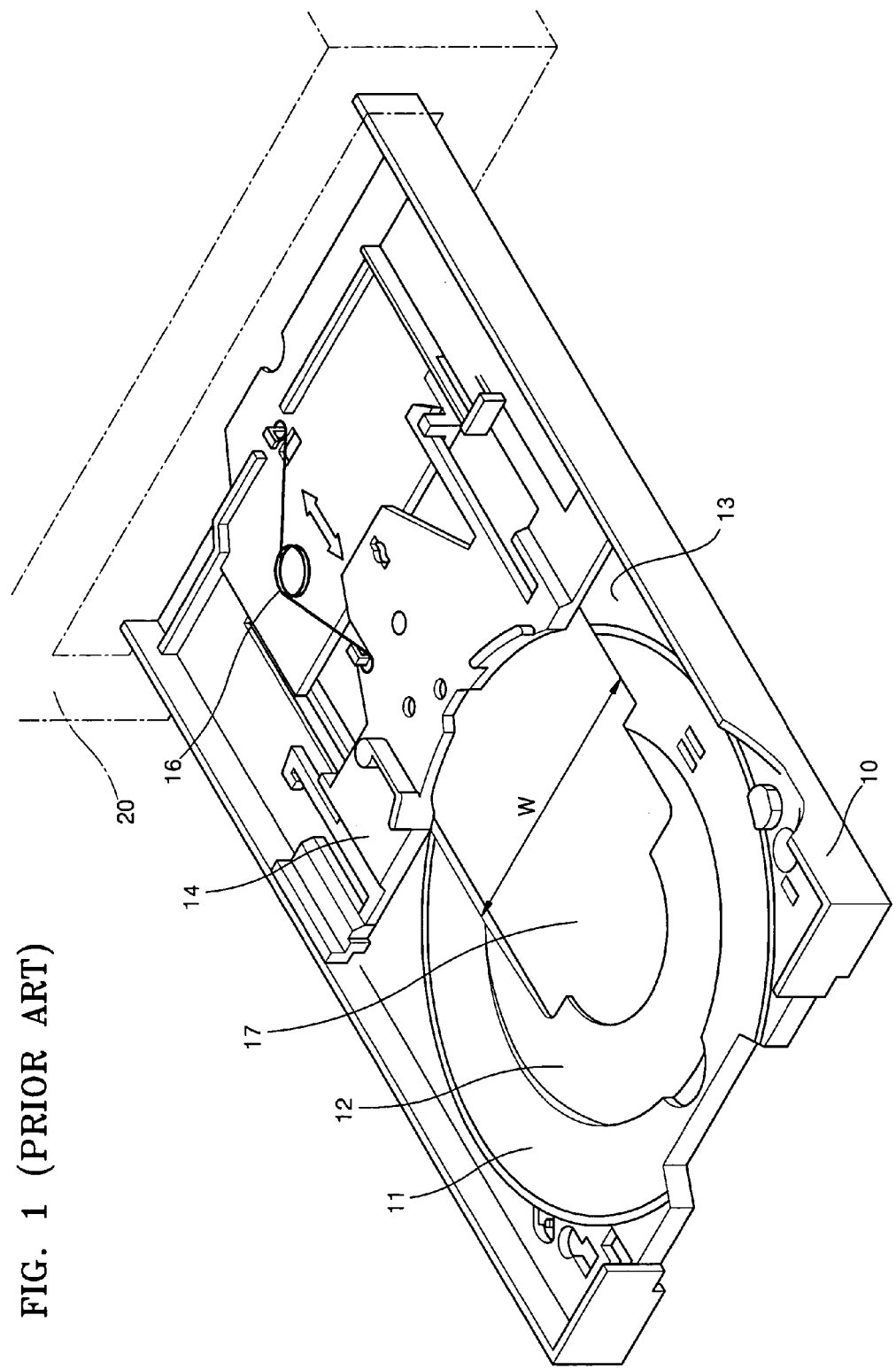
FIG. 1 is a perspective view of an example of a tray in which a disk or disk cartridge is selectively accommodated.
Figure 2:
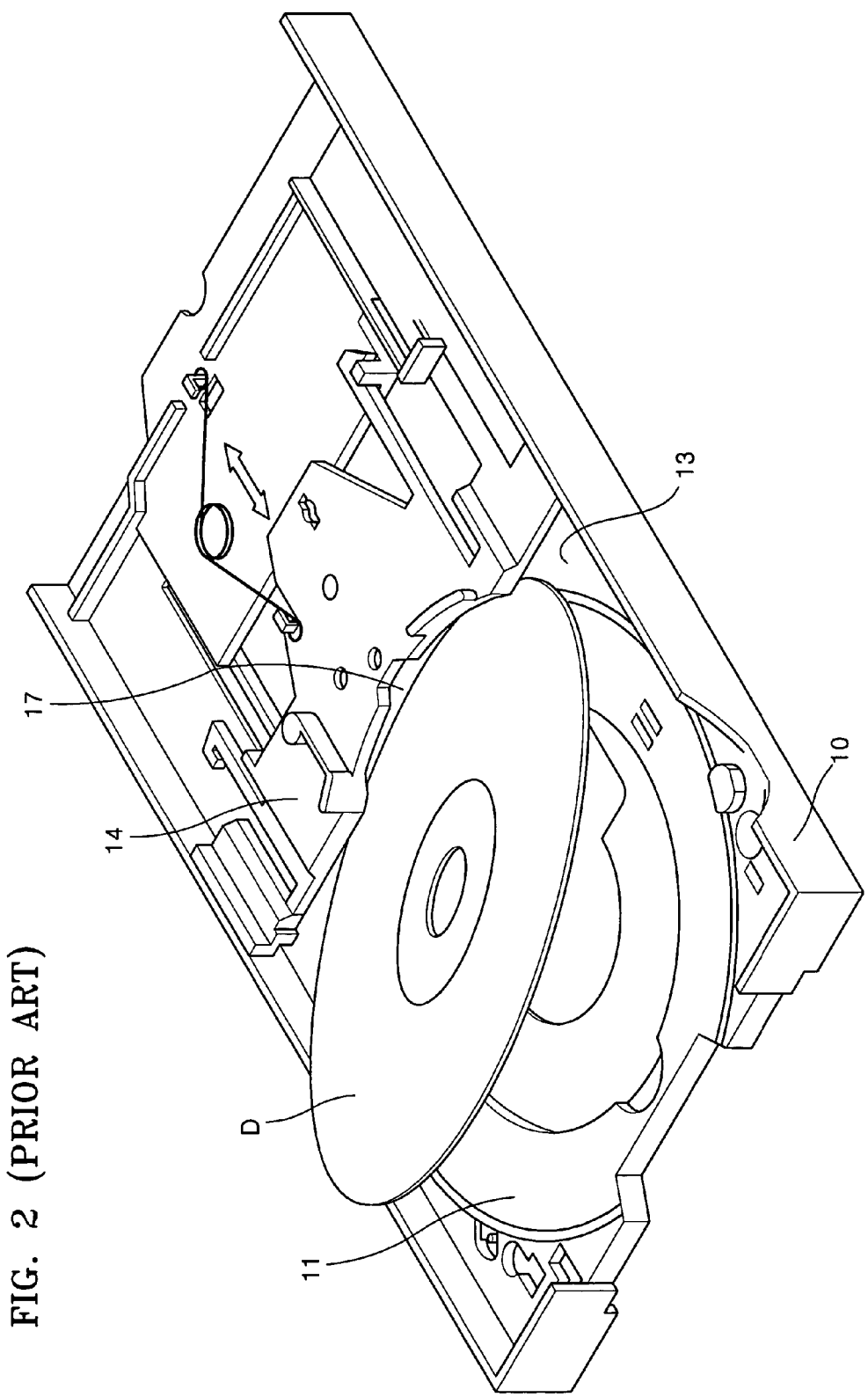
FIG. 2 is a drawing illustrating a disk which is caught between a tray and a disk cartridge holder.
Figure 3:
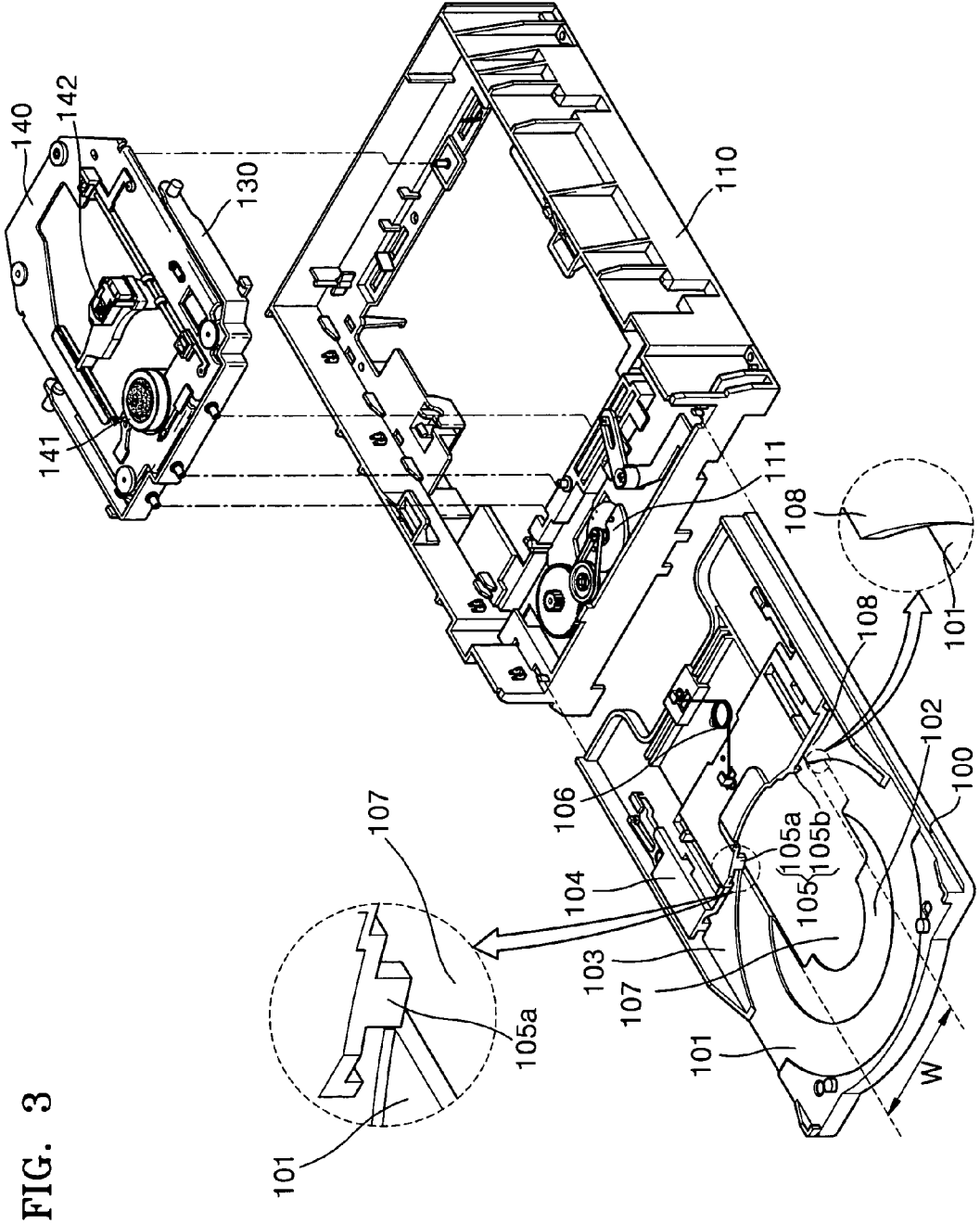
FIG. 3 is an exploded perspective view of an example structure of a disk drive according to an embodiment of the present invention.

FIG. 3 is an exploded perspective view of a structure of a disk drive according to an embodiment of the present invention.

Referring to FIG. 3, a disk drive includes a main frame 110, a tray 100, a sub-frame 130, and a base chassis 140. The tray 100 is installed to insert in and out of the main frame 110, and includes a first seating portion 101 for accommodating a 120 mm diameter disk (not shown), a second seating portion 102 for accommodating an 80 mm diameter disk (not shown), and a third seating portion 103 in which a disk cartridge (not shown) holding a disk is seated. The sub-frame 130 is installed in the main frame 110 to be capable of rotating up and down, and the base chassis 140 is supported by the sub-frame 130.

The base chassis 140 includes a turntable 141 in which the disk is placed, a spindle motor (not shown) which is installed in the same axis with the turntable 141 and rotates the turntable 141, and an optical pickup device 142 which is installed to be capable of sliding in a direction radial to the disk and recording information on the disk or reading the recorded information from the disk.

An opening hole 107 is formed in the tray 100 such that the turntable 141 can access the disk, and such that the optical pickup device 142 is capable of sliding in a direction radial to the disk.

A disk cartridge holder 104, which fixes the disk cartridge seated in the third seating portion 103 and which is capable of sliding, is installed on an upper surface of the tray 100. In addition, a spring 106 applies an elastic force to the disk cartridge holder 104 in an opposite direction to a direction in which the tray 100 is inserted into the main frame 110, one end of the spring 106 being fixed in the upper surface of the tray 100, and the other end thereof being fixed in the disk cartridge holder 104.

When the 120 mm or 80 mm diameter disk is inserted into the first seating portion 101 or the second seating portion 102, the spring 106 applies an elastic force to the disk cartridge holder 104 in an opposite direction to a direction in which the tray 100 is inserted into the main frame 110.

When the disk cartridge is seated in the third seating portion 103, the disk cartridge holder 104 is pushed back in the tray 100, and thus, the spring 106 is compressed.

A plurality of ribs 105 are formed at a predetermined distance from each other in a front portion of the disk cartridge holder 104 and protrude downward, i.e., toward the opening hole 107. The ribs 105 form a part of the first seating portion 101 and serve to guide the disk in the first seating portion 101.

The plurality of ribs 105 include a first rib 105a and a second rib 105b. It is preferable that the first and second ribs 105a and 105b are placed near a first and second side of the opening hole 107, respectively, and at short distances to the opening hole 107.

The first and second ribs 105a and 105b are placed near the opening hole 107 at short distances to prevent the disk from becoming caught between the first rib 105a and the opening hole 107, or between the second rib 105b and the opening hole 107, when the disk is seated on the first seating portion 101.

The second rib 105b is separated from a guide jaw 108 at a predetermined distance and is formed having two steps. The two-step second rib 105b does not interfere with the optical pickup device 142 which slides in a direction radial to the disk. However, this is just one of several ways to prevent the second rib 105b from interfering with the sliding optical pickup device 142.

It is preferable that the plurality of ribs 105 protrude from the disk cartridge holder 104 toward the opening hole 107 until the plurality of ribs 105 reach the bottom (or seating surface) of the first seating portion 101. However, if the plurality of ribs do not interfere with the optical pickup device 142, the plurality of ribs 105 may protrude beyond the bottom (or seating surface) of the first seating portion 101.

A guide jaw 108, which partly covers the opening hole 107 such that a length of the disk which is caught in the opening hole 107, is reduced by decreasing a width W of the opening hole 107, and is formed in one side of the opening hole 107. It is preferable that the guide jaw 108 is formed in a location higher than the bottom (or seating surface) of the seating portion 101 and thereby, prevents the disk from becoming caught in the guide jaw 108 even when the disk is slantly inserted.

The guide jaw 108 protrudes from one side of the opening hole 107 to the opposite side of the opening hole 107 in order to support the disk and to form part of the first seating portion 101. It is preferable that the guide jaw 108 is formed to be combined with the tray 100.

A length of the guide jaw 108 protruding from one side of the opening hole 107 to the opposite side of the opening hole 107 can be determined according to a motion range such that the guide jaw 108 does not interfere with the optical pickup device 142 sliding in the opening hole 107.

An operation example of the above device to prevent the disk from becoming caught between the disk cartridge holder 104 and the opening hole 107 according to the present invention will now be described in greater detail.

Figure 4:
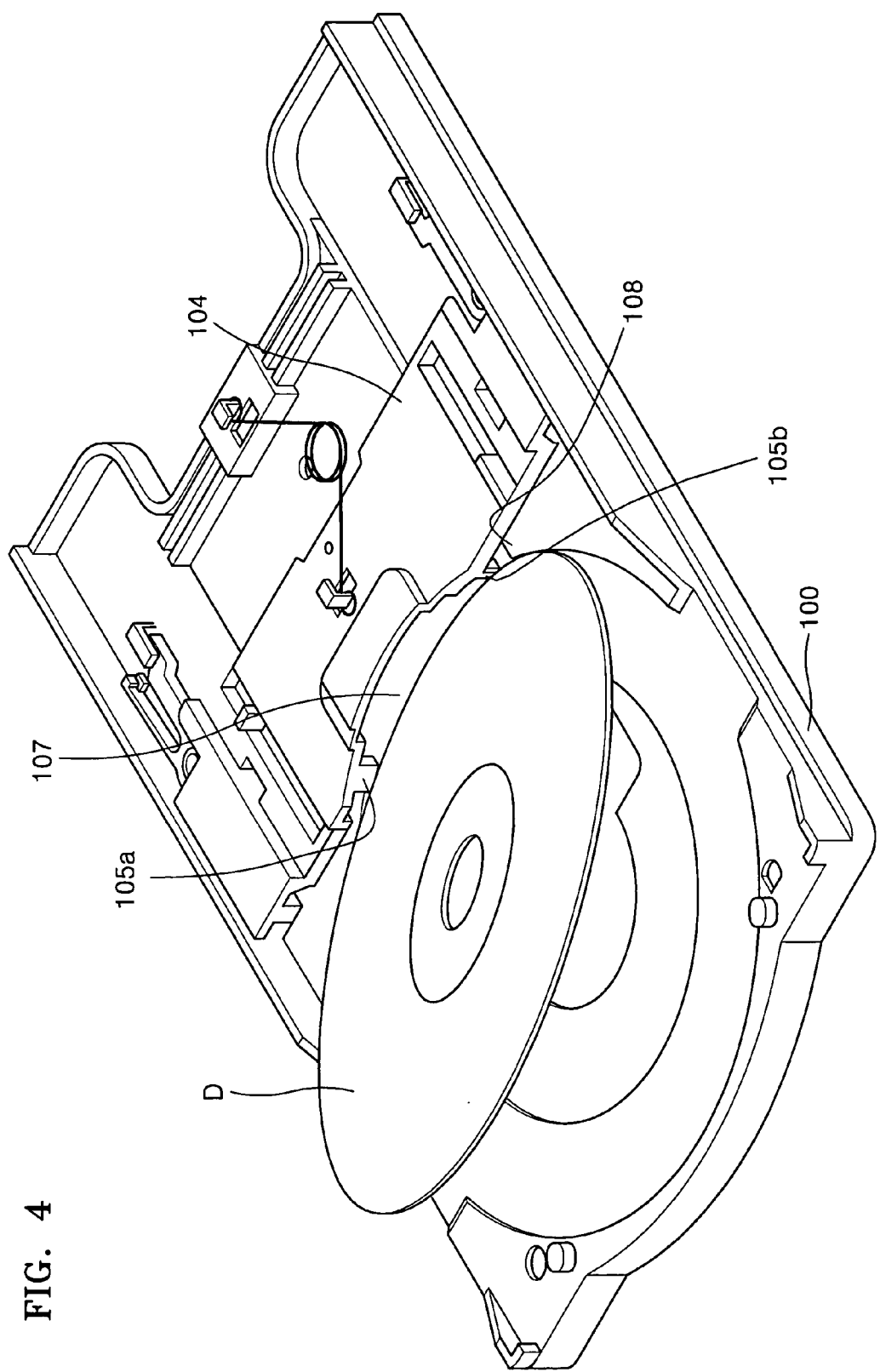
FIG. 4 is a drawing illustrating an operation to prevent a disk from becoming jammed in an opening hole by contact with a guiding jaw when the disk is slantly inserted into a tray according to an embodiment of the present invention.

FIG. 4 is a drawing illustrating an operation to prevent a disk D from becoming jammed in an opening hole 107 by contacting a guiding jaw 108 when the disk D is slantly inserted into a tray 100.

Referring to FIG. 4, where a user slantly inserts a 120 mm diameter disk D into the first seating portion 101, the disk is caught by the guide jaw 108, thereby preventing the disk from being inserted beyond the lower part of the rib 105b.

Moreover, since the disk D is also caught by the first rib 105a formed near one side of the opening hole 107, the disk is not inserted beyond the lower part of the first rib 105a.

Therefore, although the user slantly inserts the disk D into the first seating portion 101, the disk is caught between the first rib 105a and the guide jaw 108 rather than between the disk cartridge holder 104 and the opening hole 107.

Figure 5:
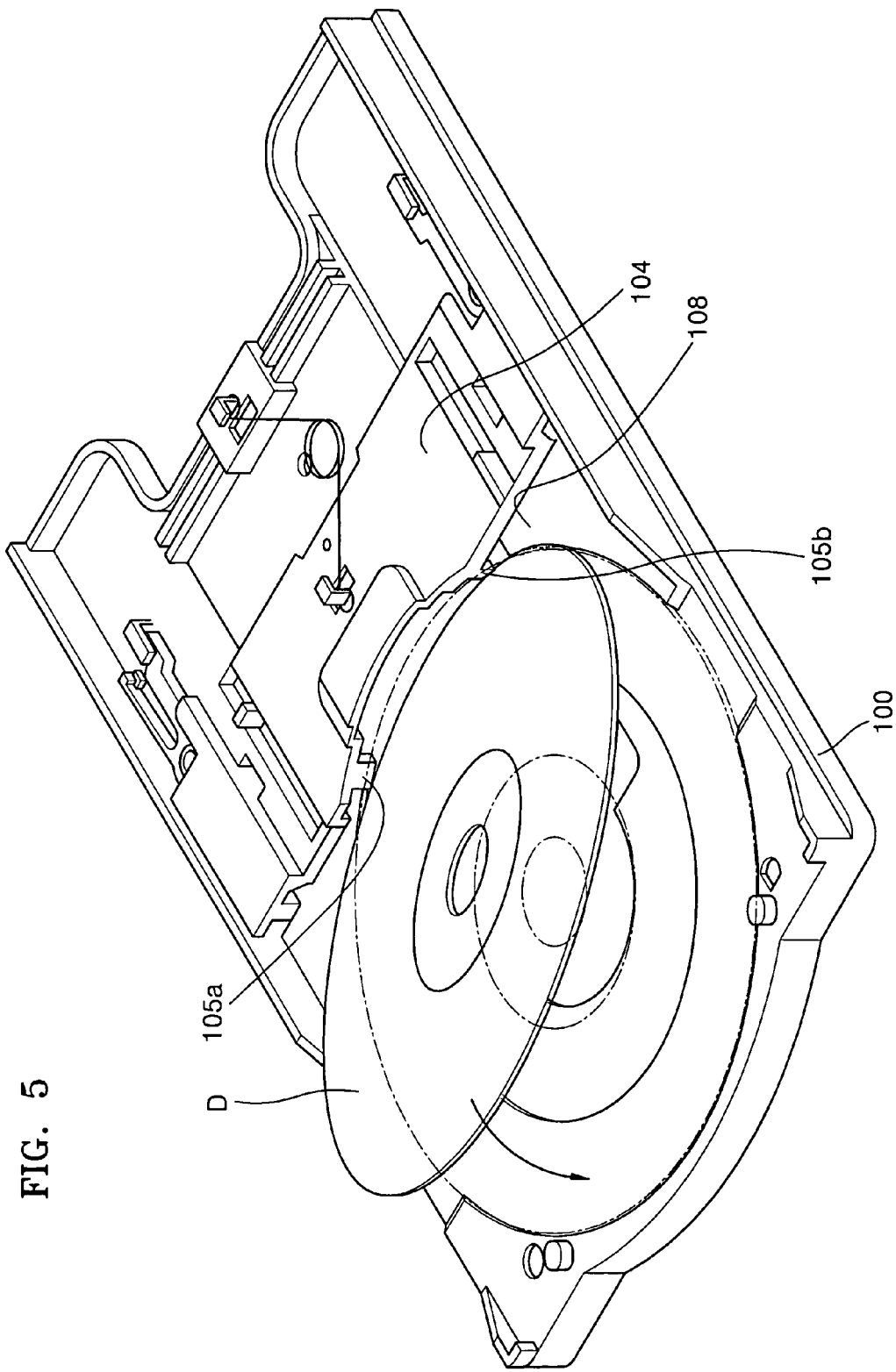
FIG. 5 is a drawing illustrating an operation to prevent a disk from becoming jammed in an opening hole by contact with a rib when the disk is slantly inserted into a tray according to embodiment of the present invention.

FIG. 5 is a drawing illustrating an operation to prevent a disk from becoming jammed an opening hole by contacting a rib when the disk is slantly inserted into a tray.

Referring to FIG. 5, where a user inserts the 120 mm diameter disk D into an upper surface of the guide jaw 108 and the disk becomes caught between the second rib 105a and the guide jaw 108, the disk D is pushed in an arrow direction and becomes separated from the second rib 105b and the guide jaw 108 when an end of the disk is caught between the second rib 105b and the guide jaw 108, since a surface of the disk which contacts the upper surface of the guide jaw 108 is very small.

When the disk D is inserted and caught by the first rib 105a, the disk D is prevented from being inserted beyond the first rib 105a.

Accordingly, although the disk D may be partly caught between the second rib 105b and the guide jaw 108, the disk is prevented from being inserted further by the first rib 105a, and is pushed in the arrow direction by the second rib 105b and the guide jaw 108. Thus, the disk D is not caught between the cartridge 104 and the opening hole 107.

As described above, in the disk drive according to the present invention, the disk is not caught between the disk cartridge and the opening hole even though the disk may be slantly inserted into the tray. Therefore, the disk is not scratched and works properly.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A disk drive, comprising:
   a tray including a seating portion in which a disk or disk cartridge is seated, and an opening hole; and
   a slidable disk cartridge holder installed on the tray, the disk cartridge holder fixing the disk cartridge to the seating portion,
   wherein the disk cartridge holder has a plurality of ribs which protrude toward the opening hole and prevent the disk to be seated in the seating portion from becoming caught between the disk cartridge holder and the tray.

2. The disk drive of claim 1, wherein the ribs protrude to the bottom of the seating portion.

3. The disk drive of claim 1, wherein the ribs are formed adjacent to opposite sides of the opening hole, respectively.

4. The disk drive of claim 1, further comprising a guide jaw formed on one side of the opening hole to cover a portion of the opening hole.

5. A disk drive, comprising:
   a tray including a seating portion in which a disk or disk cartridge is seated, and an opening hole;
   a slidable disk cartridge holder installed on the tray, the disk cartridge holder fixing the disk cartridge to the seating portion; and
   a guide jaw formed on one side of the opening hole to cover a portion of the opening hole, the guide jaw including a concave portion for facing the disk.

6. The disk drive of claim 5, further comprising a plurality of ribs formed at a predetermined distance from each other in a front portion of the disk cartridge holder and protruding downward toward the opening hole.

7. The disk drive of claim 6, wherein the plurality of ribs form a part of the seating portion and serve to guide the disk in the seating portion to avoid jamming during disk positioning.

8. The disk drive of claim 6, wherein the plurality of ribs comprise a first rib and a second rib placed near a first and second side of the opening hole, respectively, and at short distances to the opening hole.

9. The disk drive of claim 8, wherein the plurality of ribs are placed near the opening hole to prevent the disk from becoming caught between the first rib and the opening hole, or between the second rib and the opening hole, when the disk is seated on the seating portion.

10. The disk drive of claim 5, wherein the guide jaw partly covers the opening hole by decreasing a width W of the opening hole and is formed in one side of the opening hole such that a length of the disk which is caught in the opening hole is reduced.

11. The disk drive of claim 8, wherein the second rib is separated from the guide jaw at a predetermined distance and is formed having two steps.

12. The disk drive of claim 5, wherein the guide jaw protrudes from one side of the opening hole to the opposite side of the opening hole to support the disk and to form part of the seating portion.

13. The disk drive of claim 1, wherein the plurality of ribs are formed at a predetermined distance from each other in a front portion of the disk cartridge holder and protrude downward toward the opening hole.

14. The disk drive of claim 1, wherein the plurality of ribs form a part of the seating portion and serve to guide the disk in the seating portion to avoid jamming during disk positioning.

15. The disk drive of claim 1, wherein the plurality of ribs comprise a first rib and a second rib placed near a first and second side of the opening hole, respectively, and at short distances to the opening hole.

16. The disk drive of claim 15, wherein the plurality of ribs are placed near the opening hole to prevent the disk from becoming caught between the first rib and the opening hole, or between the second rib and the opening hole, when the disk is seated on the seating portion.

17. The disk drive of claim 15, wherein the second rib is formed having two steps.

18. The disk drive of claim 4, wherein the guide jaw includes a concave portion for facing the disk.

19. The disk drive of claim 4, wherein the guide jaw partly covers the opening hole by decreasing a width W of the opening hole and is formed in one side of the opening hole such that a length of the disk which is caught in the opening hole is reduced.

20. The disk drive of claim 4, wherein the guide jaw protrudes from one side of the opening hole to the opposite side of the opening hole to support the disk and to form part of the seating portion.

* * * * *